(12) United States Patent
Siegel

(10) Patent No.: US 9,939,133 B2
(45) Date of Patent: Apr. 10, 2018

(54) ILLUMINATING STANDOFF DEVICE AND METHOD

(71) Applicant: Jerry S. Siegel, Los Angeles, CA (US)

(72) Inventor: Jerry S. Siegel, Los Angeles, CA (US)

( * ) Notice: Subject to any disclaimer, the term of this patent is extended or adjusted under 35 U.S.C. 154(b) by 70 days.

(21) Appl. No.: 14/972,035

(22) Filed: Dec. 16, 2015

(65) Prior Publication Data
US 2016/0169485 A1    Jun. 16, 2016

Related U.S. Application Data

(60) Provisional application No. 62/092,648, filed on Dec. 16, 2014.

(51) Int. Cl.
| | | |
|---|---|---|
| F21S 8/08 | (2006.01) | |
| F21V 21/02 | (2006.01) | |
| F21V 17/00 | (2006.01) | |
| G09F 13/00 | (2006.01) | |
| F21V 3/04 | (2018.01) | |
| F21V 23/00 | (2015.01) | |
| F16B 5/06 | (2006.01) | |
| F16B 33/00 | (2006.01) | |

(52) U.S. Cl.
CPC .............. F21V 17/00 (2013.01); G09F 13/00 (2013.01); F16B 5/065 (2013.01); F16B 33/002 (2013.01); F21V 3/049 (2013.01); F21V 23/001 (2013.01)

(58) Field of Classification Search
CPC .......... F21V 17/00; F21V 17/06; F21V 17/10; F21V 3/042; F21V 3/049; F21V 3/02; F21V 21/108; F21S 6/002; F21S 8/033; F21S 8/036; G02B 6/0096
See application file for complete search history.

(56) References Cited

U.S. PATENT DOCUMENTS

| | | | | |
|---|---|---|---|---|
| 5,207,571 A | * | 5/1993 | Greenvurcel | F21V 35/00 248/225.11 |
| 5,498,091 A | * | 3/1996 | Chan | F16B 17/006 362/410 |
| 5,772,172 A | * | 6/1998 | Sampedro | E01F 9/696 248/415 |
| 6,305,821 B1 | * | 10/2001 | Hsieh | F21V 5/041 362/237 |
| 6,629,772 B2 | * | 10/2003 | Brunfeld | G02B 6/0008 362/257 |
| 6,991,355 B1 | * | 1/2006 | Coushaine | F21K 9/00 362/241 |
| 8,556,456 B2 | * | 10/2013 | Boonekamp | G02B 6/0008 362/231 |
| 9,274,270 B2 | * | 3/2016 | Vissenberg | F21V 14/00 |
| 2004/0252515 A1 | * | 12/2004 | Opolka | F21L 4/005 362/410 |

* cited by examiner

*Primary Examiner* — Peggy Neils
(74) *Attorney, Agent, or Firm* — Cislo & Thomas, LLP; Kelly W. Cunningham

(57) ABSTRACT

The illuminating standoff device to support and illuminate transparent, semi-transparent, and/or a translucent light diffusing member. Thus, the standoff provides support and attachment to the wall or support structure, while at the same time allowing light to pass through said standoff and/or projecting or inducing light into the diffusing member while supporting and retaining its position. This allows one to support and secure the diffusing member, and illuminate the diffusing member, both through a single device.

20 Claims, 5 Drawing Sheets

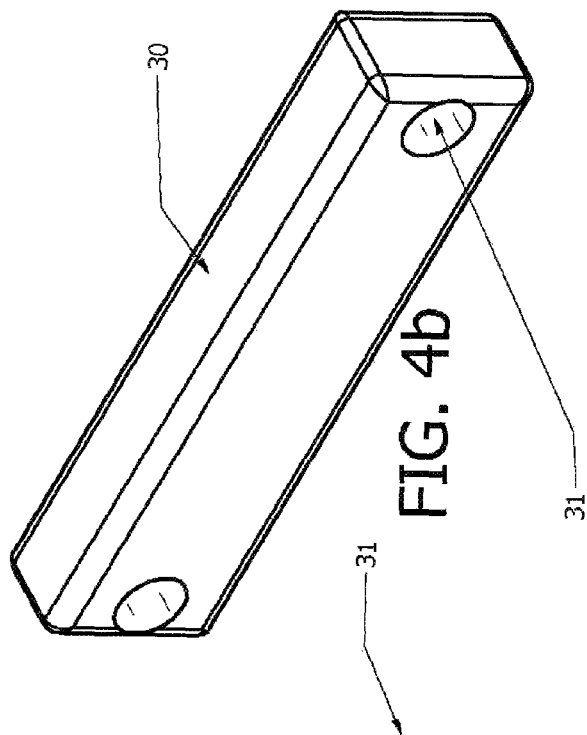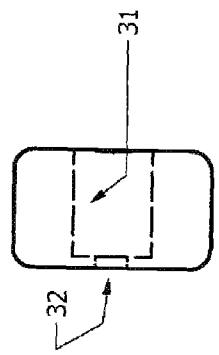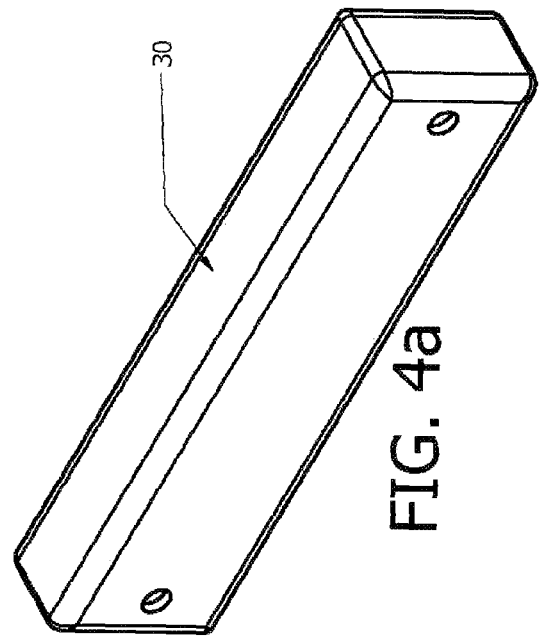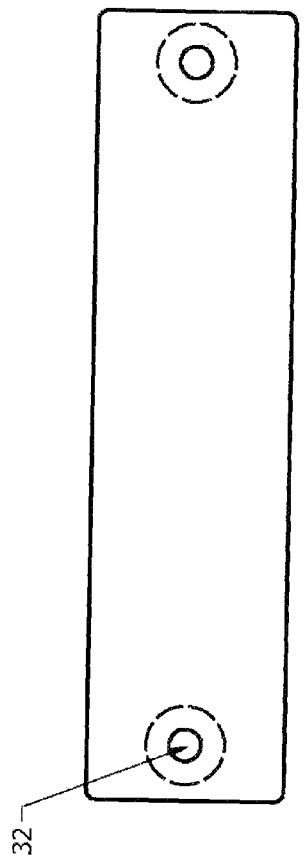

ILLUMINATING STANDOFF DEVICE AND METHOD

CROSS-REFERENCES TO RELATED APPLICATIONS

This application claims the benefit of U.S. Provisional Patent Application No. 62/092,648 filed Dec. 16, 2014, which is incorporated here in its entirety by this reference.

FIELD OF THE INVENTION

This invention relates to an apparatus and method for creating an illuminating standoff device, and more particularly to an illuminating standoff device that also serves as a weight-bearing support for one or more members that are to be illuminated.

BACKGROUND OF THE INVENTION

The prior art in this field generally requires two different types of hardware to accomplish the required tasks of supporting and illuminating a diffusing member affixed to a wall, or support structure, held by a standoff.

The traditional standoff is used for supporting and holding off a section of glass, acrylic, or other transparent or translucent diffusing member from a wall, base, or other supporting structure. This type of hardware is usually made of metal, polymer, wood, or ceramic, and can be commonly purchased through most hardware distributors. An example of this type of hardware would be standoff Part #94706A140 available from McMaster-Carr.

Light injection devices such as electrical hardware can be used to inject light into a piece of glass, acrylic or light diffusing member. An example of this type of hardware is the 3D Crystal Glass Trophy Laser LED Rotating Electric Light Stand Base.

However, instead of having multiple devices that perform distinct functions, there is a need for a single device capable of performing the desired functions. The objects and advantages of the illuminating standoff are to provide a single, simple, sophisticated and inexpensive piece of hardware to:

a. Support a sheet of glass, acrylic, or some other transparent and/or translucent light diffusing member affixed to a wall or support structure;
b. Provide a means to house a light source in the standoff;
c. Provide a mean to replace the light source from the front should it need maintenance, repair or replacement;
d. Provide a means to focus the light emanating from the light source in the illuminating standoff into the transmitting material of the diffusing member illuminating any etchings or defects that have been purposefully inscribed in the diffusing member;
e. Provide a removable cap in the visible end of the standoff that aesthetically hides the retaining screw used in the pre-tapped external end of the standoff;
f. Provide a cam detail on the back end of said standoff to prevent the standoff from rotating in place when a light source, end cap, or screw is introduced to said standoff.

SUMMARY OF THE INVENTION

One embodiment of the present invention pertains to an illuminating standoff device that may both support and illuminate one or more glass, acrylic, or other transparent, semi-transparent, and/or translucent light diffusing members. The illuminating standoff device and system elegantly combines the hardware used for these two processes into one assembly which simultaneously can both support and illuminate such a member, optionally including at a predetermined standoff distance from a base support wall or frame.

BRIEF DESCRIPTION OF THE DRAWINGS

FIG. 4A is a perspective view of a light diffusing presentation diffusing member in accordance with an embodiment of the present invention.

FIG. 4B is a rear perspective view of the light diffusing member of FIG. 4A.

FIG. 4C is a front view of the light diffusing member of FIG. 4A where the diffusing member is semi-transparent and or translucent.

FIG. 4D is a side view of the light diffusing member shown of FIG. 4A where the diffusing member is semi-transparent and or translucent.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

It will be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
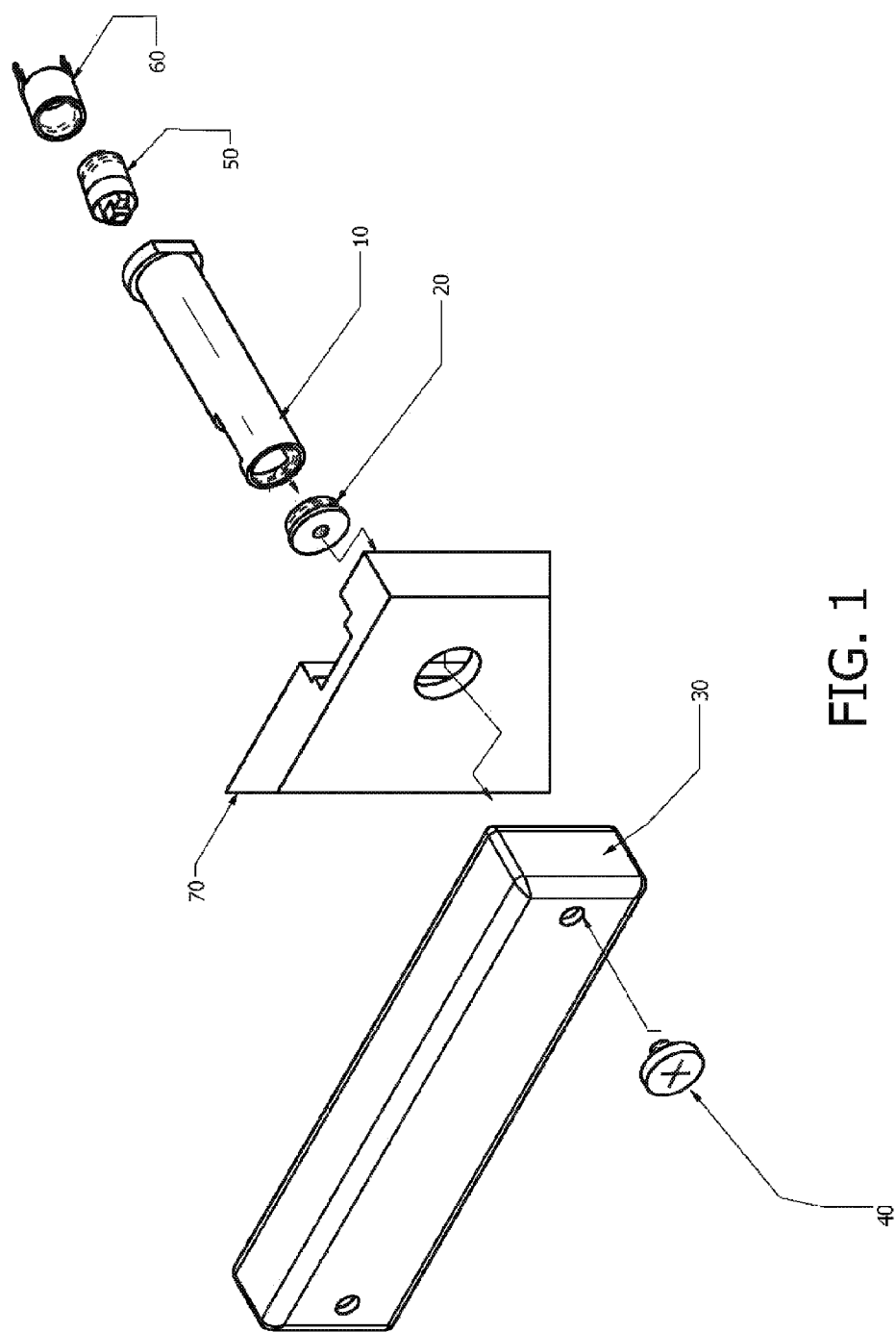
FIG. 1 is an exploded perspective view of an illuminating standoff device in keeping with an embodiment of the present invention.

FIG. 1 shows an exploded perspective view of an embodiment of an illuminated standoff device in accordance with an embodiment of the present invention. Such an illuminated standoff 10, or standoff support 10, is open at a first end to receive a light source 50 powered by an electrical source 60. At a second end, the illuminated standoff 10 may have an end cap. The assembly fits through the support frame 70, or support board 70, and is held in place by a retaining flange having a cam. A light diffusing structure 30, or illuminable structure 30, containing a recess fits over a portion of the protruding end of the illuminated standoff 10. In some embodiments, a retaining fastener 40 secures the light diffusing structure 30 to the illuminated standoff 10. When the light source 50 shines inside the illuminated standoff 10, the light is released out a window into the light diffusing structure 30.

Figure 2:
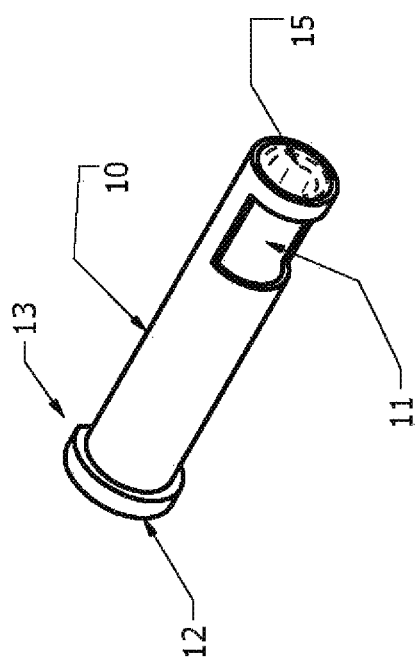
FIG. 2 is a perspective view of an illuminating standoff device in keeping with an embodiment of the present invention.

FIG. 2 shows one such illuminated standoff 10 in accordance with an embodiment of the present invention. The window or gate 11 enables light to depart the standoff through its side and thus illuminates the etchings, disturbances, or other designs or color elements in the light diffusing structure 30. A cam 13 is engineered into the illuminated standoff 10, such as a retaining flange 12 as shown in FIG. 2, to prevent rotation of the illuminated standoff 10 once it is set in place in the support board 70. The top of the illuminated standoff 10 may be threaded 15 to allow the secure introduction of an end cap 20 to the illuminated standoff 10.

Figure 3:
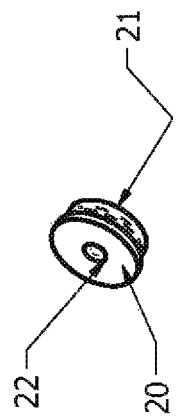
FIG. 3 is a perspective view of a service end cap in keeping with an embodiment of the present invention.

FIG. 3 shows a more detailed view of the cap 20. The cap 20 may have threads in multiple places. For example, the outer threads 21 are in place to securely fasten to the illuminated standoff 10. The inner central threads 22 are in place to securely fasten to a retaining fastener 40 (such as the one shown in FIG. 5).

FIG. 4 shows the light diffusing member 30, with a pre-bored recess 31, which is of a diameter to receive the second end of the illuminated standoff 10. This feature thus receives the standoff assembly, allowing for the full strength of the material of the illuminated standoff 10 to support the weight of the light diffusing member 30. In the front of the light diffusing member 30, another bored hole is introduced of a smaller diameter 32, to receive the retaining fastener 40. The position of the retaining fastener 40 allows for easy removal and replacement or substitution of light diffusing member 30, or a series of such diffusing members 30, which may have different etchings or design elements to produce a different visual effect.

Figure 5:
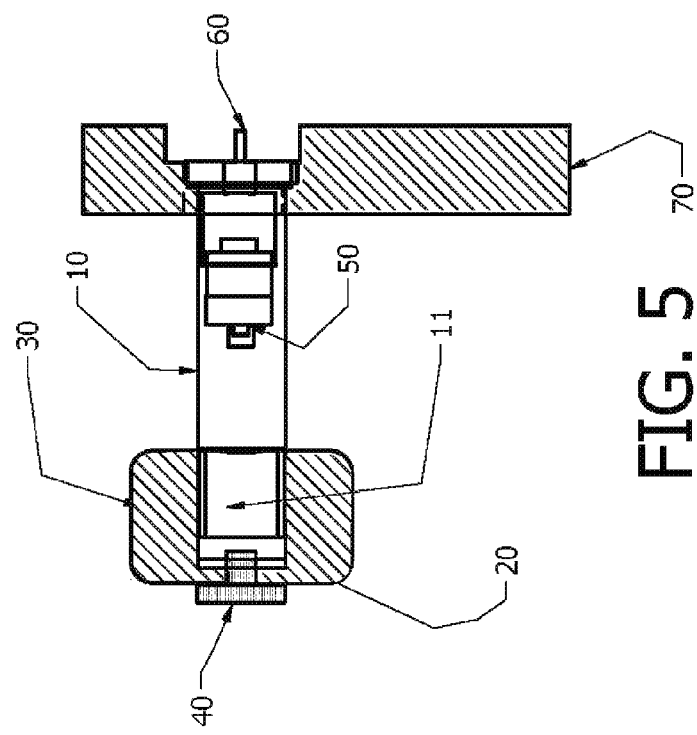
FIG. 5 is a cross-sectional view of an illuminating standoff device in accordance with an embodiment of the present invention.

FIG. 5 shows the side view of one embodiment of the illuminating standoff assembly. The light diffusing member 30 receives the retaining fastener 40 into the end cap 20. The recess 11 is seen to focus light into the light diffusing member 30. The illuminated standoff 10 then creates a predetermined standoff distance from the support board 70. The standoff distance may be a single consistent distance for multiple units of diffusing member 30 or it may comprise two, three, or many different distances to produce a more textured visual appearance. The illuminated standoff 10 also receives and houses the light source 50 which receives power from the power source 60.

Figure 6:
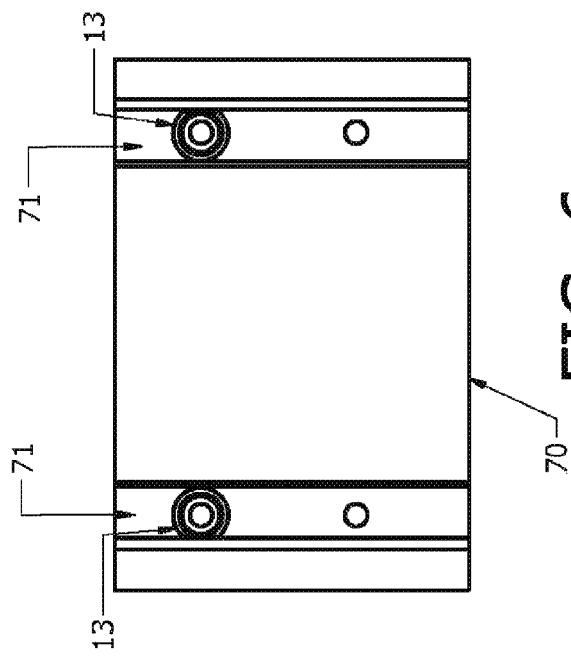
FIG. 6 is a rear view of a cam locking system of an illuminating standoff device in accordance with an embodiment of the present invention.

FIG. 6 shows an embodiment of machined detail of material that is removed from the support board 70 from the backside. This detail is a combination of offset grooves 71 that receive the flange 12 and invites the cam 13 to be positioned, disabling the illuminating standoff 10 from turning, thereby ensuring that the illumination will remain pointed in the desired direction.

Figure 7A:
FIG. 7A is a top view of a support frame for an illuminating standoff device in accordance with an embodiment of the present invention.
Figure 7B:
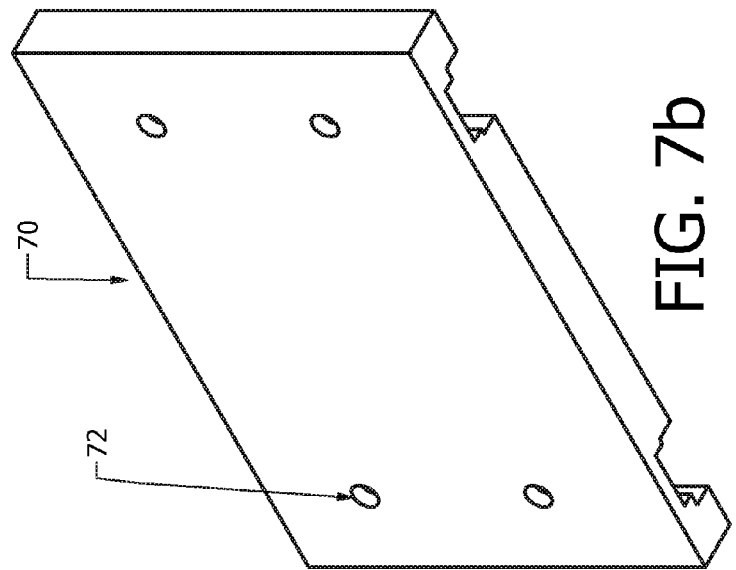
FIG. 7B is a front view of the support frame of FIG. 7A.
Figure 7C:
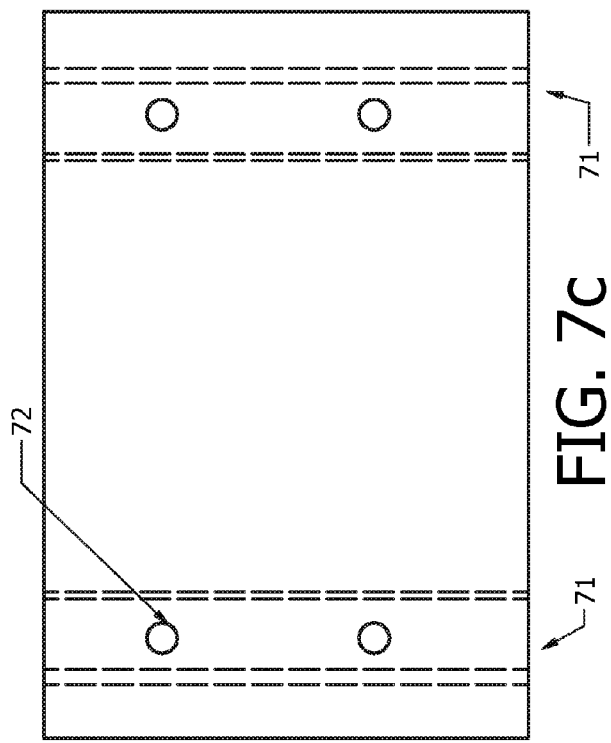
FIG. 7C is a perspective view of the support frame of FIG. 7A offering the illusion of a substantially flat and uninterrupted support wall.

FIG. 7 shows an embodiment of the support board 70 with pre-routed grooves 71 that receive flange 12 and catch and affix the cam 13 on the end of the illuminated standoff 10. Additionally, the support board 70 is pre-bored with entry holes for the power source 60 to provide access to the light source 50 in the illuminated standoff 10.

One preferred embodiment of the present invention, therefore, provides one or several pairs of standoffs of any desired design or length that has been engineered to accomplish two tasks simultaneously in the field of hardware. Namely, the illuminating standoffs will both support a diffusing member at a specific distance from a wall, or supporting structure, and at the same time allow said diffusing member to be illuminated by means of a light source that has been implanted in the standoff in such a manner that it can project light into the transmitting material of the light diffusing member. Although this description is very specific, it should not be considered a limiting description that inhibits variations that either a professional or lay person would want to make. For example, the length of the standoffs could easily vary and the placement of the light source could be situated in various points in the standoff. The means of supporting the standoff could be something different than a supporting board as seen in FIG. 7 and could be accomplished with supporting cables.

The standoff could comprise two or more windows or gates. Two oppositely facing gates could ensure that more volume of the diffusing member can be illuminated. Also, the gates could be several smaller orifices to provide a different pleasing illumination effect.

The grooves 71 may be paired so that each receives one of a pair of standoffs 10, as discussed above. Then the pair of standoffs 10 may receive one light diffusing member 30. Alternatively, the system could utilize more than two grooves 71 such that the more than two grooves could support more than two standoff posts for a light diffusing member or a single series of light diffusing members. A single groove alternatively may hold a single standoff that alone supports a single light diffusing member, or a series of such single standoffs, each supporting a single light diffusing member. And in the foregoing various embodiments, the groove or grooves could be oriented horizontally or vertically, they could be generally parallel as shown in FIGS. 6 and 7B, or non-parallel such as to support light diffusing members of varying and unequal lengths. Also, the grooves could readily be straight, non-straight, or curved along either a single wall or frame 70 or multiple wall or frames 70 in different geometric planes in order to provide various visual effects or serve various functional purposes as well.

In any of the foregoing cases, the hardware would still function by supporting and illuminating one or more light diffusing members 30 at one or more given distances from the frame or wall 70. Those skilled in manufacture and use will appreciate the range of combinations of this hardware for simultaneously supporting and illuminating a light diffusing member without departing from the essential essence of this invention. Thus, the scope of the invention should be determined by the appended claims and their legal equivalents, rather than by just the examples given above.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A standoff device for supporting and illuminating a light diffusing structure, the standoff device comprising
   a generally horizontal hollow support structure having a first end and a second end and a path there between, wherein the first end is open to receiving a light source, wherein the second end is closed with a gate window positioned along one side of said support structure to transmit light from the light source in a direction generally perpendicular to said path;
   wherein the second end is configured to support a light diffusing structure, wherein the light diffusing structure comprises a recess configured to enclose at least a portion of the gate window in the second end of the hollow support structure, wherein the light diffusing structure is configured to receive the light through the gate window and to diffuse the light so received.

2. The standoff device of claim 1, further comprising a support frame with at least one hole to install the hollow support structure.

3. The standoff device of claim 2, wherein the first end further comprises a cam, wherein the cam prevents rotation of the standoff device when installed in the support frame.

4. The standoff device of claim 3, wherein the support frame comprises two paired vertical channels, wherein the vertical channels have holes at matching heights to install hollow support structures, and wherein the light diffusing structure comprises two recesses for detachably connecting with two hollow support structures of matching height.

5. The standoff device of claim 4, wherein the vertical channels further comprise wiring to power light sources of hollow support structures.

6. The standoff device of claim 1, wherein at least a portion of the hollow support structure is cylindrical in shape.

7. The standoff device of claim 1, wherein the light diffusing structure comprises a block of a diffusing member and an etched design, wherein the etched design is illuminated by the light source.

8. A method for both supporting and illuminating a light diffusing structure, the method comprising:
   Providing a hollow support structure having a first end and a second end horizontally disposed having a generally horizontal path there between, wherein the first end is open to receiving a light source, wherein the second end is closed except with a window along at least one side of said second end to permit light emission from the light source generally perpendicular to said horizontal path; and
   Providing a light diffusing structure, wherein the light diffusing structure has at least one recess to detachably receive at least a portion of the window of the second end of the hollow support structure, and wherein light from the light source is diffused in the light diffusing structure through the window of the second end.

9. The method of claim 8, further comprising providing a support frame to hold one or more hollow support structures, wherein the support frame comprises holes for attaching hollow support structures.

10. The method of claim 9, wherein each hollow support structure further comprises a cam at the first end to affix the hollow support structure to the support frame.

11. The method of claim 10, wherein the support frame further comprises two paired vertical channels, wherein the vertical channels have holes at matching heights to install hollow support structures, and wherein the light diffusing structure comprises two recesses for detachably connecting with two hollow support structures of matching height.

12. The method of claim 11, further comprising providing power to light sources through the two paired vertical channels.

13. The method of claim 8, wherein at least a portion of the hollow support structure is cylindrical in shape.

14. The method of claim 8, wherein the light diffusing structure comprises a block of a diffusing member and an etched design, wherein the etched design is illuminated by the light source.

15. A method for both supporting and illuminating a plurality of light diffusing structures with a plurality of hollow support structures comprising:
   vertically orienting a support frame configured to position said plurality of support structures, each said support structure extending horizontally away from said vertically oriented support frame and comprising a light source near one end and a window near the other end,
   emitting light from said light source and through a window on a side wall of said support structure;
   mounting a plurality of light diffusing structures on the window ends of said plurality of support structures, each light diffusing structure configured to receive light thorough said window of at least one of said plurality of support structures, wherein the plurality of support structures both support and illuminate the plurality of light diffusing structures.

16. The method of claim 15, wherein the light source of each support structure is configured to automatically turn on when a light diffusing structure is connected to the support structure.

17. The method of claim 15, further comprising providing a control mechanism to control power to the light source of each of the plurality of support structures.

18. The method of claim 17, wherein the control mechanism is configured to turn on a light source of a support structure based on a predetermined day of a given year.

19. The method of claim 15, further comprising engraving a surface of at least one of the plurality of light diffusing structures so that the engraving refracts the light from the light source of at least one of the plurality of support structures.

20. The method of claim 15, wherein the plurality of light support structures are removable from and re-attachable to the support frame.

* * * * *